(12) United States Patent
Blahut

(10) Patent No.: US 7,665,262 B2
(45) Date of Patent: Feb. 23, 2010

(54) COMPOSITE BEVEL SIDING

(75) Inventor: James Blahut, Manahawkin, NJ (US)

(73) Assignee: Integritect Consulting, Inc., Medford, NJ (US)

(*) Notice: Subject to any disclaimer, the term of this patent is extended or adjusted under 35 U.S.C. 154(b) by 0 days.

(21) Appl. No.: 11/797,982

(22) Filed: May 9, 2007

(65) Prior Publication Data

US 2007/0294971 A1 Dec. 27, 2007

Related U.S. Application Data

(60) Provisional application No. 60/798,740, filed on May 9, 2006.

(51) Int. Cl.
 *E04D 1/00* (2006.01)
(52) U.S. Cl. ............... 52/560; 52/309.16; 52/309.7; 52/800.1; 428/67
(58) Field of Classification Search .......... 52/309.9, 52/783.1, 782.1, 784.14, 784.15, 787.1, 790.1, 52/793.1, 794.1, 796.12, 797.1, 800.1, 560, 52/309.7, 309.16, 309.6, 309.4, 309.13, 799.11; 428/67, 151, 157, 158, 159, 160, 172
See application file for complete search history.

(56) References Cited

U.S. PATENT DOCUMENTS

| 25,288 | A | * | 8/1859 | Sweotsir | 52/560 |
|---|---|---|---|---|---|
| 232,617 | A | * | 9/1880 | Raymond, II | 428/157 |
| 290,884 | A | * | 12/1883 | Howe | 52/514 |
| 399,374 | A | * | 3/1889 | Brown | 52/560 |
| 1,191,932 | A | * | 7/1916 | Loyer | 52/560 |
| 1,577,935 | A | * | 3/1926 | Runkle | 52/560 |
| 2,241,603 | A | * | 5/1941 | Kirschbraun | 52/560 |
| 3,053,295 | A | * | 9/1962 | Duncan | 144/368 |
| 3,301,732 | A | * | 1/1967 | Kunz | 156/304.3 |
| 3,437,360 | A | * | 4/1969 | Rasmussen et al. | 52/586.1 |
| 3,593,479 | A | * | 7/1971 | Hinds et al. | 52/313 |
| 3,769,119 | A | * | 10/1973 | Mizell et al. | 156/83 |
| 3,791,912 | A | * | 2/1974 | Allard | 428/159 |
| 3,793,128 | A | * | 2/1974 | Chancellor, Jr. | 428/76 |
| 3,961,118 | A | * | 6/1976 | Michaelis | 428/151 |
| 4,028,450 | A | * | 6/1977 | Gould | 264/45.5 |
| 4,029,037 | A | * | 6/1977 | Hogan | 114/127 |
| 4,118,533 | A | * | 10/1978 | Hipchen et al. | 442/371 |
| 4,147,004 | A | * | 4/1979 | Day et al. | 52/309.9 |
| 4,157,640 | A | * | 6/1979 | Joannes | 52/309.7 |
| 4,251,578 | A | * | 2/1981 | Kaufmann | 428/53 |
| 4,428,991 | A | * | 1/1984 | Kamstrup-Larsen | 428/44 |
| 4,454,192 | A | * | 6/1984 | Suzuki | 428/299.4 |
| 4,520,062 | A | * | 5/1985 | Ungar et al. | 428/148 |
| 4,835,026 | A | * | 5/1989 | Horiki et al. | 428/40.6 |
| 5,026,585 | A | * | 6/1991 | Funatogawa | 428/71 |

(Continued)

*Primary Examiner*—Robert J Canfield
*Assistant Examiner*—Matthew J Gitlin
(74) *Attorney, Agent, or Firm*—Drinker Biddle & Reath LLP

(57) ABSTRACT

A plank is disclosed. The plank has a cellular thermoform plastic substrate, a groove formed in at least one planar surface of the cellular thermoform plastic substrate, and a fiber reinforced thermoset plastic backing on the at least one planar surface. The fiber reinforced thermoset plastic backing includes a fiber chord positioned in the groove, a fiber matt placed upon at least a portion of the one planar surface, and a cured strip thermoset resin on the one planar surface in which the fiber chord and the fiber matt are embedded. Planks for siding of buildings and a method of forming the plank are also disclosed.

4 Claims, 5 Drawing Sheets

U.S. PATENT DOCUMENTS

| | | | | |
|---|---|---|---|---|
| 5,067,296 A | * | 11/1991 | Brown et al. | 52/309.7 |
| 5,070,668 A | * | 12/1991 | Lieberman | 52/309.9 |
| 5,081,810 A | * | 1/1992 | Emmert | 52/220.2 |
| 5,209,036 A | * | 5/1993 | Cancilliari | 52/309.4 |
| 5,373,674 A | * | 12/1994 | Winter, IV | 52/309.9 |
| 5,660,907 A | * | 8/1997 | Skalka | 428/67 |
| 5,741,574 A | * | 4/1998 | Boyce et al. | 428/119 |
| 5,763,042 A | * | 6/1998 | Kaiser et al. | 428/108 |
| 5,840,392 A | * | 11/1998 | Clark et al. | 428/40.1 |
| 5,842,314 A | * | 12/1998 | Porter | 52/309.7 |
| 5,910,352 A | * | 6/1999 | Tingley | 428/114 |
| 6,042,680 A | * | 3/2000 | Peterman | 156/254 |
| 6,054,207 A | * | 4/2000 | Finley | 428/317.9 |
| 6,119,422 A | * | 9/2000 | Clear et al. | 52/309.8 |
| 6,428,876 B1 | * | 8/2002 | Peterman | 428/172 |
| 6,464,915 B1 | * | 10/2002 | Schaen | 264/146 |
| 6,698,157 B1 | * | 3/2004 | Porter | 52/794.1 |
| 6,892,507 B1 | * | 5/2005 | Pease | 52/794.1 |
| 6,972,149 B2 | * | 12/2005 | Kuipers et al. | 428/156 |
| 2007/0125041 A1 | * | 6/2007 | Misbin | 52/782.1 |

* cited by examiner

COMPOSITE BEVEL SIDING

RELATED APPLICATION DATA

This application claims the benefit of priority under 35 U.S.C. §119(e) to U.S. Provisional Application No. 60/798,740, filed May 9, 2006, the entire contents of which are incorporated herein by reference.

FIELD

The present disclosure relates to exterior siding for buildings. More particularly, the present disclosure relates to beveled planks formed from the reinforced cellular plastic substrates and methods of fabricating the planks. The planks can be substitutes for traditional wood-based siding products.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

As a replacement to traditional wood sidings, many new products have been developed. The primary focus of such products is weather resistance. Also of considerable consideration are the overall authenticity and other aesthetic qualities of the installed product on a building.

Two dominate products to consider are sidings made from fiber cement and vinyl. Fiber cement siding has an authentic look and feel when painted. It is a generally weather resistant material that is also thermally stable. However it has several undesirable characteristics. First, being a cementitous material, it is heavy and difficult to work with using common wood working tools and techniques. Also, due to manufacturing limitations, this type of siding product is not available in a traditional beveled (or wedge shaped) geometry. What is meant by this is that traditional siding products, whether a shake or clap board, are thicker at the bottom exposed butt end (+/−½") and taper to a much thinner thickness (+/−⅛" or less) at the upper, overlapped edge. Current fiber cement siding products are often thinner (+/−⅜" or less) and do not vary in thickness across their width. The individual strips of siding are cut from a larger flat sheet. Rather than having a cross-sectional geometry that is a tapered wedge, it is produced as a thin flat rectangle. In industry terminology, this is considered a lapboard siding rather than true clapboard. A shortcoming of this difference in profile is the combined thickness created from overlapping two or more layers of siding when installed. Often the increased thickness can causes issues with matching up with trim thicknesses. This is one consideration that prevents thicker more authentic profiles from being manufactured.

Vinyl siding provides a low maintenance cladding for certain end users but lacks an authentic appearance. Considerable efforts have been made to enhance patterns and textures. In all cases however, the means of attachment remains that the siding panels are interlocked with one another and "hung" loosely on the sidewall as opposed to being nailed firmly into place. This leaves the siding susceptible to wind damage. Further the panels are installed in channels around window/door openings and corners. In many instances, the water resistance along this interface relies on the house wrap or felt paper that covers the sheathing. Further, vinyl is flimsy and dimensionally unstable with respect to temperature. As a result it is prone to buckle when exposed to high temperatures. Also limiting is the fact that each panel consists of several courses of siding, and cannot be crafted or otherwise modified on site to conform to a custom profile or exposure.

As an alternative, solid, cellular thermoform plastics, such as cellular polyvinyl chloride, have the physical attributes to produce an authentic look, feel, and workability. However, when considering long thin geometries such as is the case with siding products, they lack rigidity and thermal stability. Often, an exterior wall surface is not perfectly flat and the siding material covering it must have the ability to remain straight along long lengths to effectively conceal these inconsistencies. Further, a siding material may experience a wide range of temperatures, especially when exposed to direct solar gains. Most common plastics experience a considerable thermal coefficient of linear expansion and contraction and also tend to soften, or become more ductile when heated, resulting in buckling. Without reinforcement, these materials typically do not possess adequate performance characteristics to provide a product that has the desired rigidity and thermal stability needed.

SUMMARY OF THE INVENTION

There is a need for a material that looks, feels and installs like a traditional wood siding product, but is comprised of a material being of a wood-like consistency that can resist weather related concerns such as warping, cupping, twisting, rot, insect damage, and paint delamination. The material needs to be rigid enough to remain relatively straight along a span of 8-12' and posses thermal characteristics to remain as stable (or more stable) as common wood species when exposed to variable temperatures and moisture conditions.

Described herein is a composite siding material and method of manufacturing said siding. The composite siding consists of a substrate material such as cellular polyvinyl chloride (CPVC) or other similar substrate and permanently attached reinforcement. The reinforcement is provided by an embedded stiffening element(s) that is bonded to the substrate using low or medium viscosity thermoset plastic or permanently curing adhesive. The reinforcement provides improved rigidity and stability characteristics to the combination as compared to that of the substrate alone. A similar technique is described to create both a clapboard siding product and a shake siding product.

A substrate having the desired physical attributes is reinforced along its backing. For example, the reinforcement may be a stiffener comprised of (1) a continuous stiffening rib within the thicker bottom edge of the profile, (2) a thin ply or fiber (matt or fabric) reinforced thermoset plastic laminated to the back of the profile or (3) a combination of both.

An exemplary embodiment of a plank comprises a cellular thermoform plastic substrate, a groove formed in at least one planar surface of the cellular thermoform plastic substrate, and a fiber reinforced thermoset plastic ($FRP_s$) backing on the at least one planar surface, the $FRP_s$ backing including a fiber chord positioned in the groove, a fiber matt placed upon at least a portion of the one planar surface, and a cured strip thermoset resin on the one planar surface in which the fiber chord and the fiber matt are embedded.

An exemplary embodiment of a plank comprises a cellular thermoform plastic substrate, having a groove formed in at least one planar surface. It is to be understood that this groove is located along the back of the profile and may be of a simple rectangular geometry (commonly known as a dado groove), or one that prevents separation of the materials that are used to fill it as a result of the groove geometry, as is the case with a "T" slot or flared bottom.

An adhesive or other curing resin can be used to fill a portion of the groove void prior to placement of the stiffener. The stiffener can be (a) a single object such as a pre-made relatively long, narrow square or round cylinder. Such elements may be made of wood, cured fiberglass, or similar strong stable materials. Or (b) if a low enough viscosity adhesive or other curing resin is used, the stiffening element may be a grouping of generally long or continuous fibers (perhaps pre-saturated) such as a chord, pulled taught and arranged parallel to the length of the groove and plank. When compatible materials are used, the adhesive, once cured, will bond to the stiffener and permanently anchor it within the substrate profile. Excess adhesive that may overflow the filled groove may simply be troweled smooth. The reinforcement aids in the overall thermal and mechanical stability of the product and also provides rigidity to long lengths of siding.

Another exemplary embodiment of a plank comprises a cellular thermoform plastic or similar substrate, having at least one planar surface abraded in effect creating an opened cell condition. The voids created along generally the back surface are filled with a low viscosity adhesive or activated thermoset resin. The low viscosity matrix also contains a fiber matt or fabric that is placed over the surface. Once cured, the fiber reinforced backing is permanently attached and provides enhanced performance characteristics to the plank. The lamination of resin saturated matt aides in the overall thermal and mechanical stability of the product and reduces the risk of fracture when nailed.

A third exemplary embodiment of a plank comprises a cellular thermoform plastic substrate, having a groove formed in at least one planar surface. This groove is located along the back of the profile and may be of a simple rectangular geometry, or one that prevents separation of the materials that are used to fill it (as is the case with a "T" slot or flared bottom). The surface containing the groove is also abraded in effect creating an opened cell condition. The groove and voids created along the back surface are filled with a low viscosity adhesive or activated thermoset resin. The low viscosity matrix also contains both fiber matt or fabric that is placed over the surface and a stiffening rod like element placed in the groove. The fiber of the matt and the rib stiffener are contained within the same resin matrix, which is anchored into the surface of the substrate. Once cured, the reinforced backing is permanently attached and provides enhanced performance characteristics to the plank. In all cases, the curing resin is formulated to provide a rigid, thermally stable reinforcement.

Once cured, the lamination of resin saturated matt aides in the overall thermal stability of the product, while the stiffener also provides rigidity to long lengths of siding.

An exemplary method of forming a siding product for a building comprises forming a groove in at least one of opposing planar surfaces of a substrate, the groove at an edge region of the substrate and the substrate formed from a cellular thermoform plastic, positioning a fiber chord in the groove, laying a fiber matt on the at least one planar surface, embedding the fiber chord and fiber matt in a thermoset resin and curing the thermoset resin to form a $FRP_s$ backing on the at least one planar surface, and cross-sectionally cutting the substrate with the $FRP_s$ backing to form a strip.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
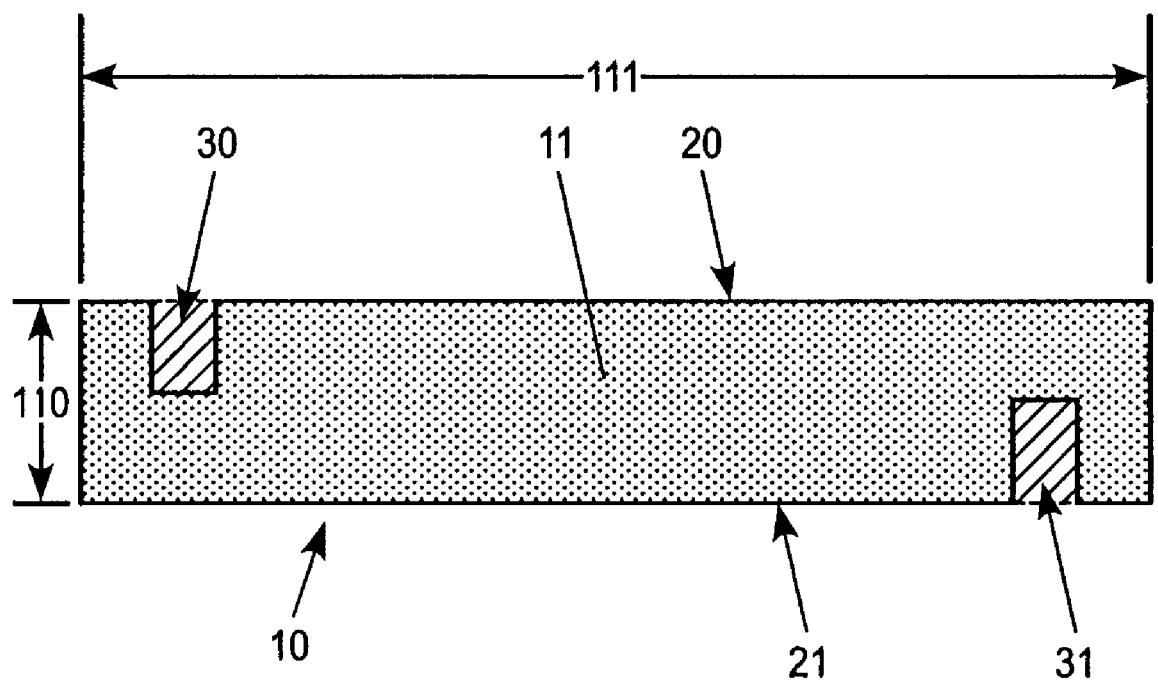
FIG. 1 is a cross-section of an exemplary embodiment of a plank.

FIG. 1 is a cross-section of an exemplary embodiment of a plank 10 being of arbitrary length. The plank 10 has a width 111, and thickness 110 and planar surface 20 and 21. The width 111 is slightly larger (+/−½") than the final siding profile and a thickness 110 is slightly greater (+/−⅛") than the final siding profile. The additional material beyond the final siding profile is removed during a later finishing process. A pair of grooves 30 and 31 are formed into both planar surfaces of a core substrate 11 along opposing and opposite edges of each, by for example, common techniques such as milling. The grooves, having a depth of approximately one half the sheet thickness and a width of approximately half its depth, are set in from the edge. The core substrate 11 may be a cellular thermoform plastic (i.e. cellular polyvinyl chloride) such as is manufactured by Azek Trimboards™, or other similar material, that has its outer planar surfaces abraded. The substrate being used can have any geometric shape, such as a panel, a plank or a sheet.

Figure 2:
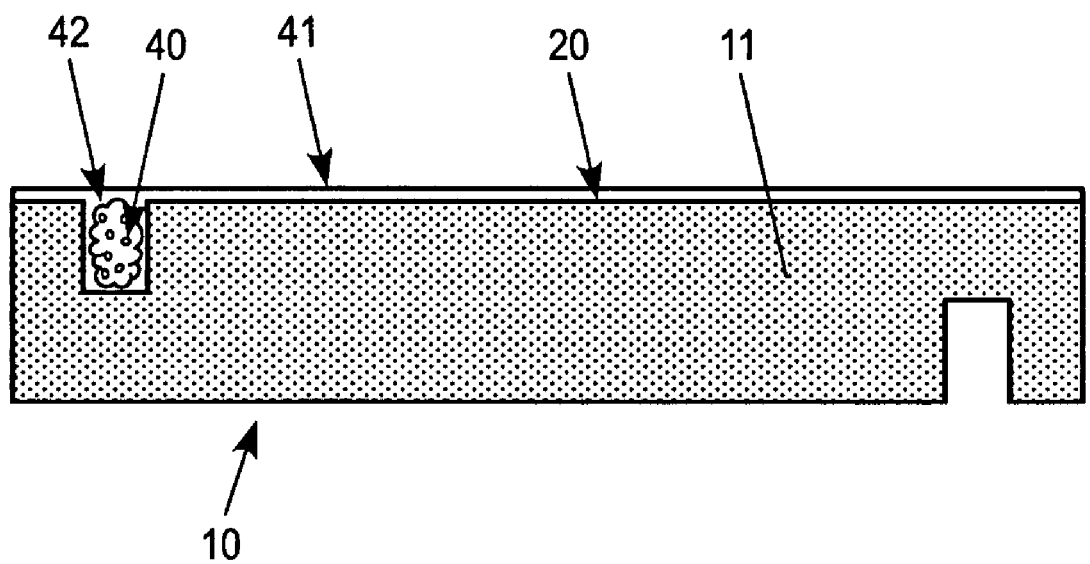
FIG. 2 is a cross-section of an exemplary embodiment of a plank with a coating of thermoset liquid resin on a first surface.

FIG. 2 is a cross-section of an exemplary embodiment of a plank 10 with reinforcement applied on a first surface. FIG. 2 is a cross-section of plank 10 being of arbitrary length, oriented horizontally, having surface 20 facing upwards. Fiber chord 40 is placed in groove 30. Fiber matt 41 is placed upon strip 11. Fiber chord 40 and matt 41 are embedded in curing thermoset resin 42

Figure 3:
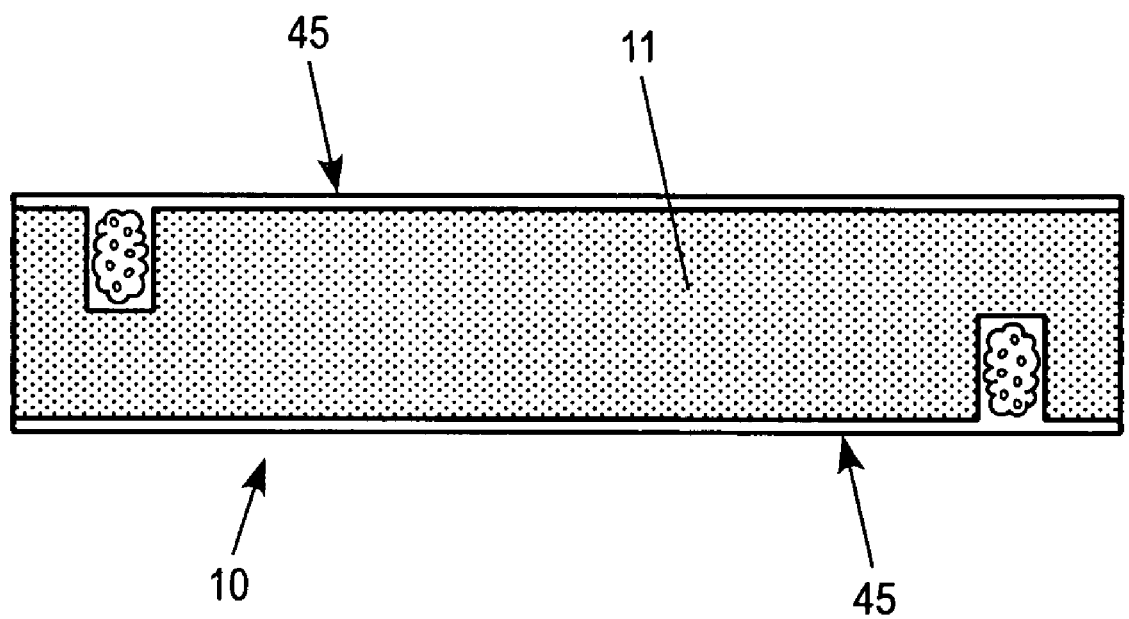
FIG. 3 is a cross-section of an exemplary embodiment of a plank with a coating of thermoset liquid resin on both a first surface and a second surface.

The plank 10, having one of its planar surfaces 20 facing upwards, has a coating of thermoset liquid resin (i.e. a polyester blend) 42 applied. A chord or grouping of continuous fibers (such as fiberglass) 40 is placed into the resin filled grove 30, then the entire surface 20 is covered with a strip of pressed fiber matt 41. The strip can be slightly narrower than the plank width. The matt 41 is saturated with liquid thermoset resin and manipulated, e.g., rolled, to remove trapper air. The plank 10 is exposed to light radiation (or other means) to initiate the curing of the activate thermoset resin. Once cured, the plank 10 is flipped over and the same process is repeated to the other side. FIG. 3 is a cross-section of an exemplary embodiment of a plank 10 with a FRP$_s$ backing 45 on both a first surface and a second surface.

Figure 4:
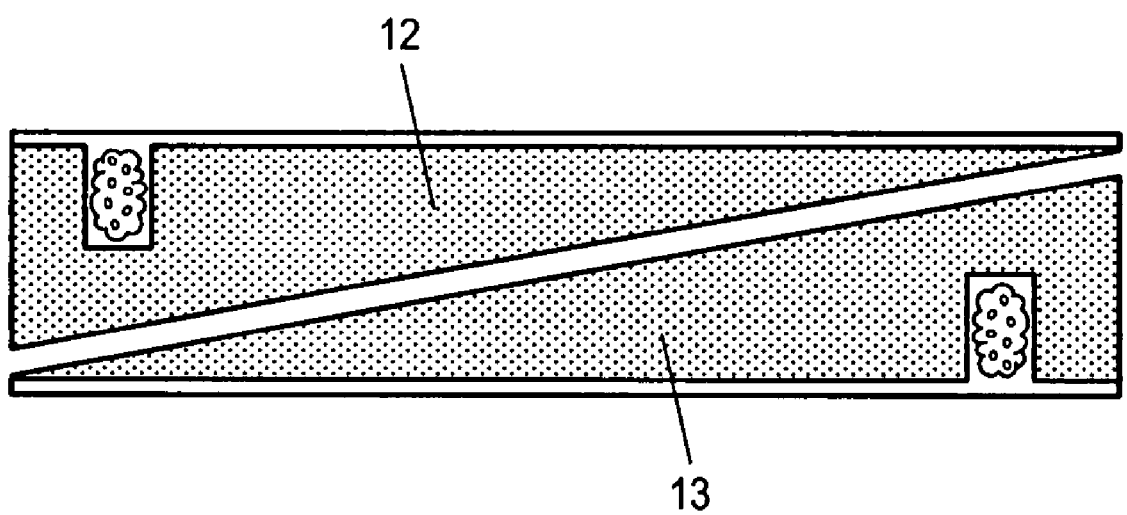
FIG. 4 is a cross-section of an exemplary embodiment of a plank with a $FRP_s$ backing on both a first surface and a second surface that has been cross-sectionally cut to produce exemplary embodiments of a tapered strip.

After both sides are complete, the plank 10 is cut using common methods, such as a circular or band saw, to produce two tapered strips 12 and 13. FIG. 4 is a cross-section of an exemplary embodiment of a plank with a FRP$_s$ backing 45 on both a first surface and a second surface that has been cross-sectionally cut to produce exemplary embodiments of a beveled strip. Typically, the plank 10 is cut diagonally, but other cross-sectional cutting paths can be used. These strips, slightly larger but closely resembling the desired end profile, are then run through a shaper/molder having cutting blades of the final finished siding profile. Further, the strips 12, 13 can be the same dimensions, but can also be of different dimensions and of different geometric shape.

Figure 5:
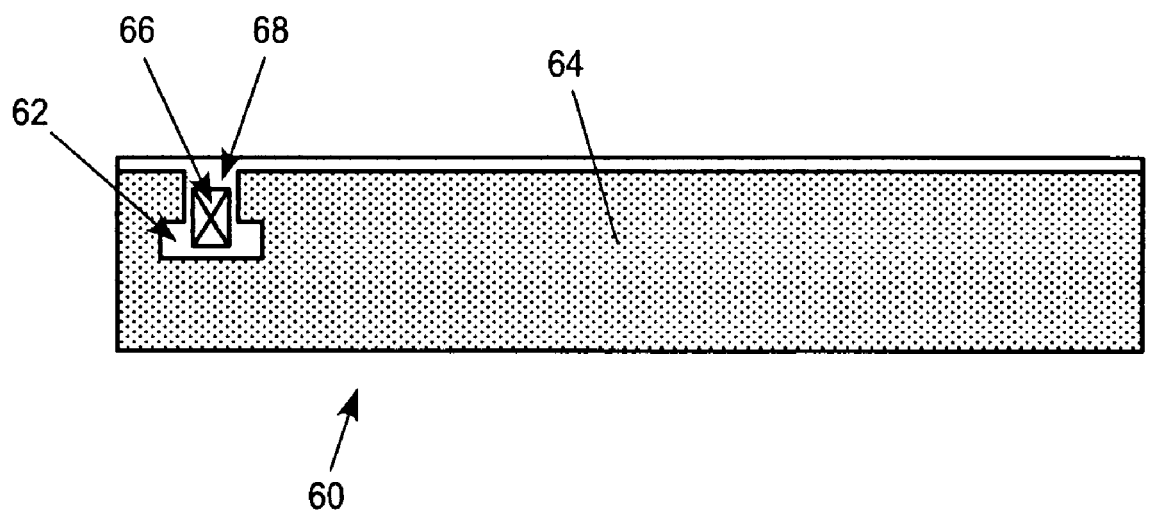
FIG. 5 is a cross-section of an exemplary embodiment of plank that has a "T" slot cut into one of its surfaces.
Figure 6:
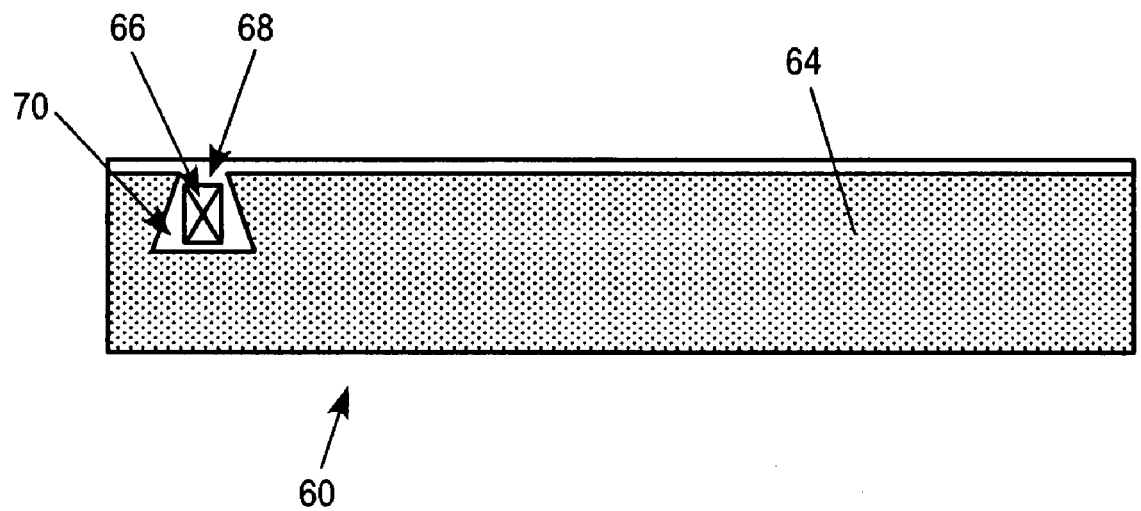
FIG. 6 is a cross-section of an exemplary embodiment of a plank that has a flared bottom slot cut into one of its surfaces.

An exemplary embodiment of a plank comprises a cellular thermoform plastic substrate, having a groove formed in at least one planar surface. It is to be understood that this groove is located along the back of the profile and may be of a simple rectangular geometry. FIGS. 5 and 6 each show a cross-section of an exemplary embodiment of plank 60 that has a slot 62 cut into one of the surfaces of the substrate 64. An example of a slot 62 is a dado groove, or other groove that prevents separation of the materials that are used to fill it as a result of the groove geometry, as is the case with a "T" slot shown in FIG. 5 or flared bottom slot 70 as shown in FIG. 6. In the slot 62 is a stiffener 66, as described herein, which is surrounded by an adhesive 68. As illustrated in FIGS. 5 and 6, once the adhesive becomes solid, it is effectively anchored into the substrate by means of its geometry.

An adhesive or other curing resin can be used to fill a portion of the groove void prior to placement of the stiffening rib. The stiffener can be (a) a single object such as a pre-made relatively long, narrow square or round cylinder. Such elements may be made of wood, cured fiberglass, or similar strong stable materials. Or (b) if a low enough viscosity adhesive or other curing resin is used, the stiffening element may be a grouping of generally long or continuous fibers (perhaps pre-saturated) such as a chord, pulled taught and arranged parallel to the length of the groove and plank. When compatible materials are used, the adhesive, once cured, will bond to the stiffener and permanently anchor it within the substrate profile. Excess adhesive that may overflow the filled groove may simply be troweled smooth. The reinforcement aids in the overall thermal and mechanical stability of the product and also provides rigidity to long lengths of siding.

Figure 9:
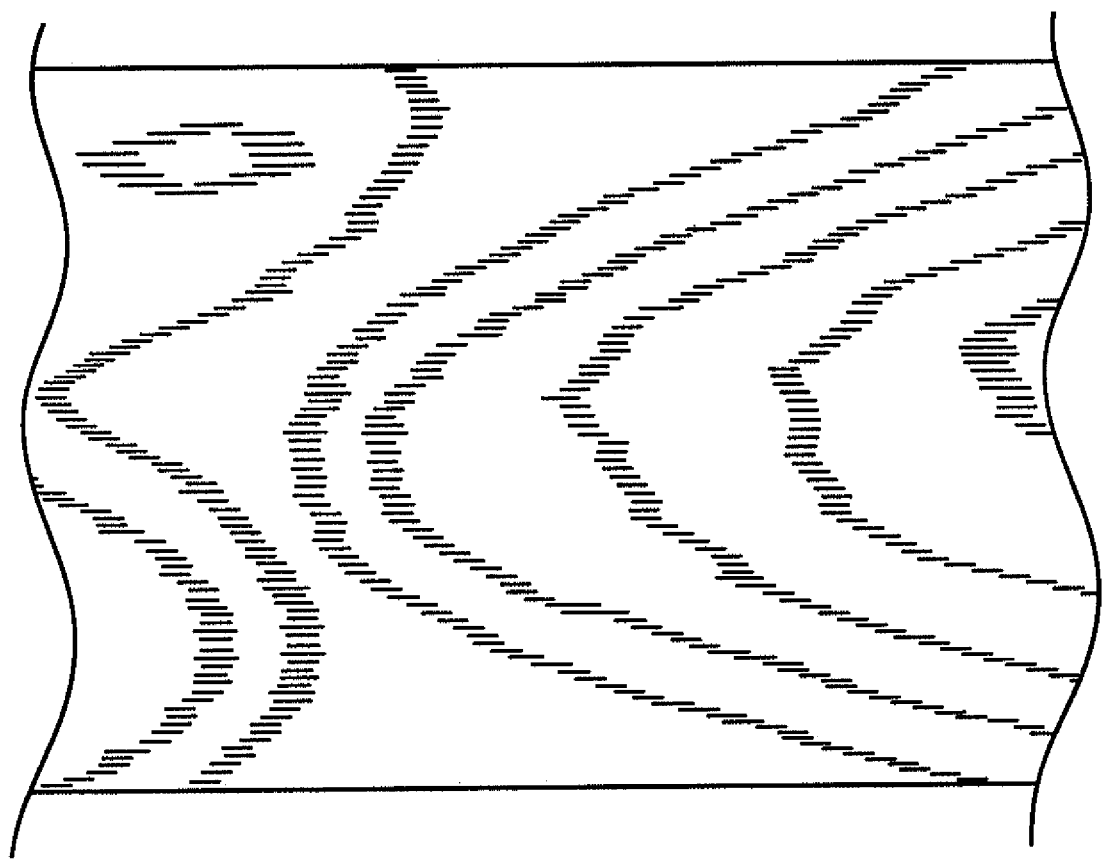
FIG. 9 is a schematic representation of an imitation wood grain pattern in a surface of the substrate.

Once installed, the FRP$_s$ backing 45 can be concealed from view and the machined surface of the strip can be the exposed surface. If a rough surface is desired, such as is the case with many types of shakes; the saw marks can be left on the surface. If a particular surface pattern is desired, such as an imitation wood grain, the outward facing thermoplastic surface of the substrate, for example the surface of the cellular thermoform plastic substrate, can be heated and pressed on a form until cooled. The patterned thermoplastic can be the exposed surface when installed. FIG. 9 is a schematic representation of an imitation wood grain pattern in a surface of the substrate.

In an exemplary embodiment of the reinforcement with a concealed backing, the backing is comprised of a thin ply of fiber (matt) reinforced thermoset plastic and a fiber (continuous) reinforced rib stiffener. The fiber of the matt and the rib stiffener are contained within the same resin matrix, which is anchored into the surface of the substrate. The curing resin is formulated to provide a rigid, thermally stable reinforcement Several applications can be performed to produce a variety of paint grade siding products and profiles from the strips. These products range from individual shakes having a butt end thickness of ½"+/–⅛", variable widths of 4"-12", and lengths of 12"-24" and a rough surface, to traditional smooth finish clapboard siding having widths of 6"-8" or more and lengths of 12' or more.

Figure 7:
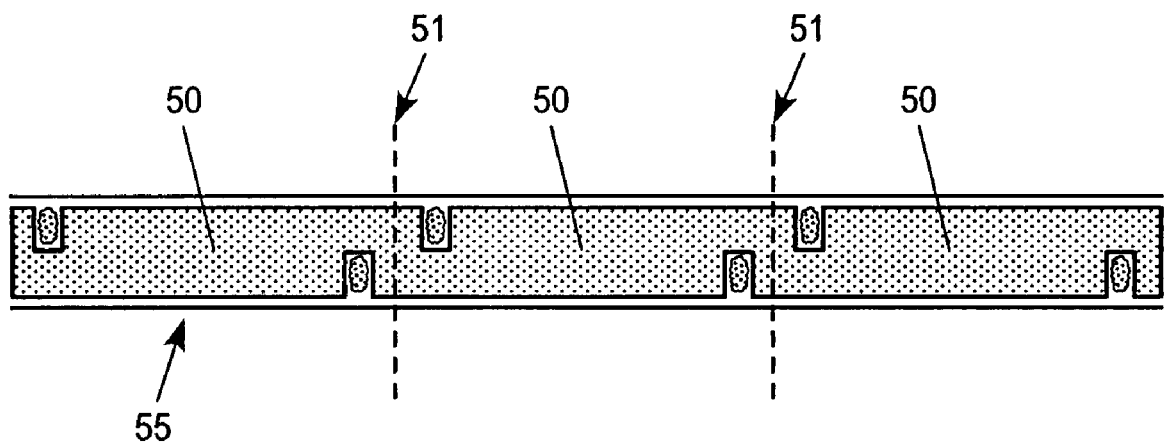
FIG. 7 is a cross-section of an exemplary sheet illustrating locations to be cut to form exemplary embodiments of planks.

In some cases, such as for clapboard siding, there is a particular consideration that allows for a more time and cost efficient method of producing large quantities of siding. It is the ability of creating multiple strips of siding from a larger single sheet. A sheet 55, as represented in FIG. 7, having a width that is three or more times the width of the finished clapboard profile, is modified so several boards 50 similar to plank 10 of FIG. 3 can be produced by cutting at locations 51. These boards 50 are then cut cross-sectionally to produce a pair of siding strips in the same manner as that which produced strips 12, 13.

Figure 8:
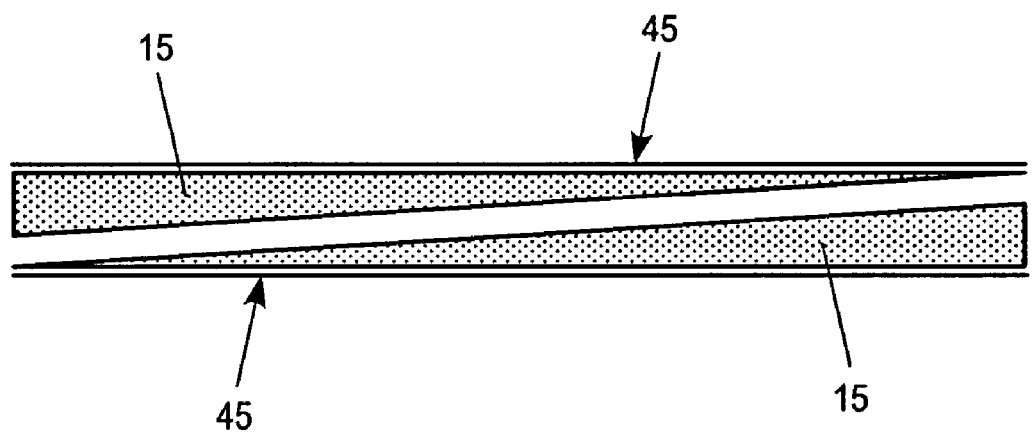
FIG. 8 is a cross-section of an exemplary embodiment of a plank that has been cross-sectionally cut to produce exemplary embodiments of a tapered strip.

When producing individual shakes, the resulting pieces are small (i.e., about 4"-12") in comparison to long lengths of clapboard siding (e.g., often 8' or greater). Further, they are installed with a gap between each piece. There is less concern for expansion and contraction or rigidity of long lengths. As a result, the reinforcing rib stiffener may be unnecessary. FIG. 8 is a cross-section of an exemplary embodiment of a plank that has been cross-sectionally cut to produce exemplary embodiments of a tapered strip 15. Rather than being left as a long length of siding, strips 15 are cut into variable shake widths to match the specifications of the traditional product being replaced.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A siding product for a building comprising:
    a tapered profile having a first end of the siding of the product with a greater thickness than a second end of the siding product;
    a concealed surface as a back of the siding product;
    a visible surface as a tapering surface of the siding product;
    a cellular thermoform plastic substrate having a surface forming the visible surface of the siding product;
    a groove formed in the surface of the cellular thermoform plastic substrate that opposes the surface forming the visible surface; and
    a reinforced thermoset plastic backing forming at least a portion of the concealed surface of the siding product, the reinforced thermoset plastic backing comprising:
        a stiffener in the groove;
        a fiber matt; and
        a cured thermo set resin embedding both the stiffener and the fiber matt.

2. The siding product of claim 1, including a pattern in the visible surface.

3. The siding product of claim 2, wherein the pattern is an imitation wood grain.

4. The siding product of claim 1, wherein the siding product is a clapboard siding element.

* * * * *